Patented Jan. 5, 1926.

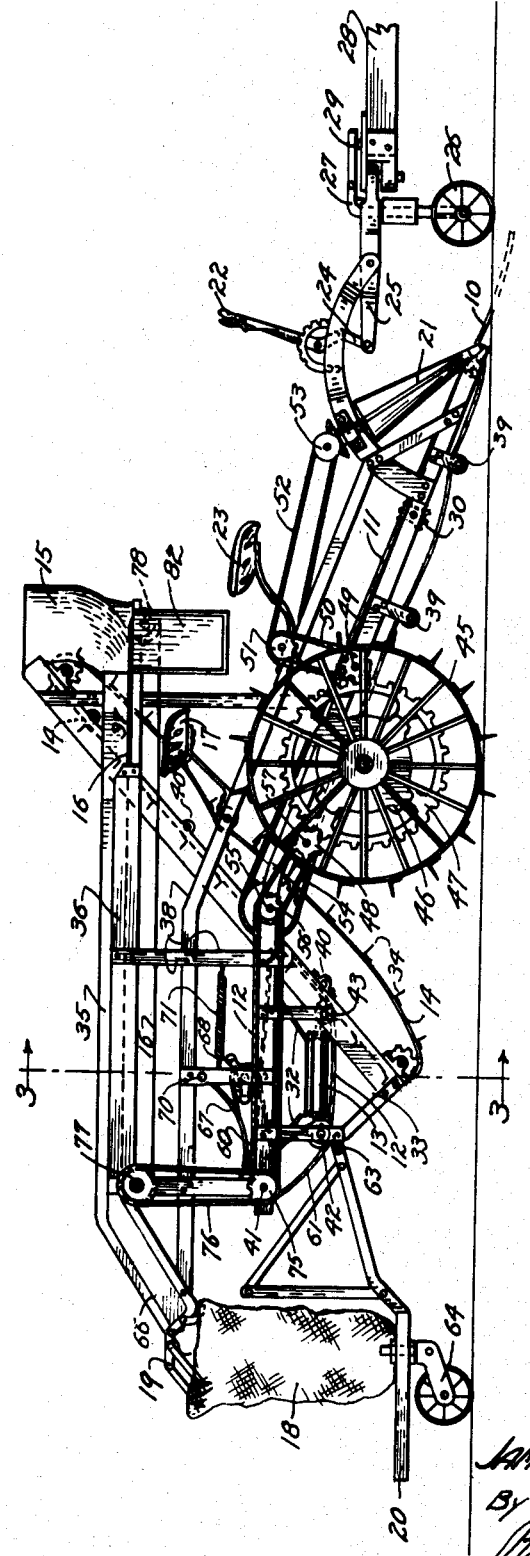

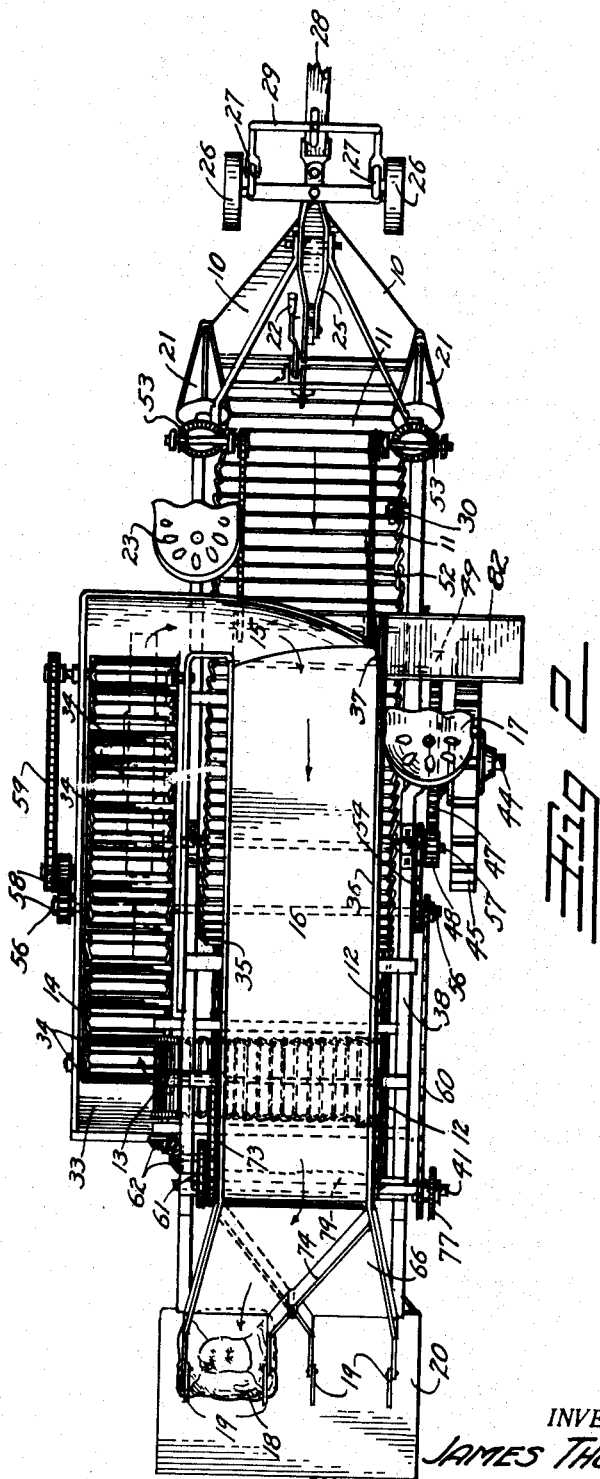

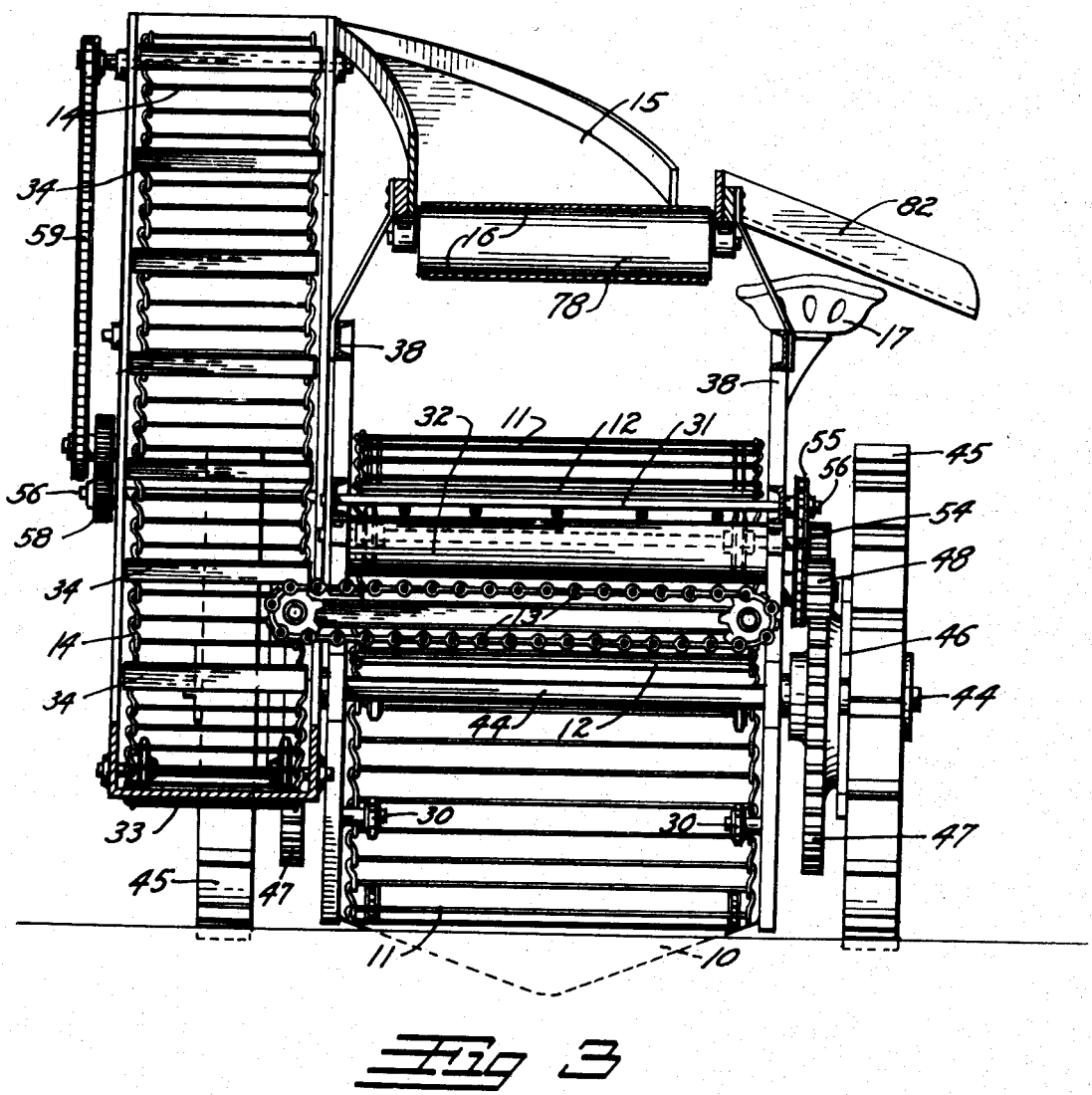

1,568,482

UNITED STATES PATENT OFFICE.

JAMES THOMPSON, OF GREELEY, COLORADO.

POTATO HARVESTER.

Application filed February 4, 1924. Serial No. 690,482.

*To all whom it may concern:*

Be it known that I, JAMES THOMPSON, a citizen of the United States of America, residing at Greeley, in the county of Weld and State of Colorado, have invented certain new and useful Improvements in Potato Harvesters, of which the following is a specification.

This invention relates to potato harvesters and has for its principal object the provision of a highly efficient device of this character which will dig the potatoes, remove the clods and vines, and sack them, while the machine is driven along the potato row.

Another object of the invention is to reduce the length that is usually required in a machine of this character.

Still another object of the invention is to so arrange the machine that the potatoes may be hand picked before being sacked.

A still further object of the invention is to provide means for gathering the potato vines into the machine.

Other objects and advantages reside in the detail construction of the invention, which results in simplicity, economy, and efficiency, and which will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the improved potato harvester.

Fig. 2 is a plan view of the same.

Fig. 3 is a vertical cross-section through the machine, taken on the line 3—3, Fig. 1.

In general, the machine comprises a plow or digger 10; a declodding chain 11; a detopping chain 12; a cross chain 13; an elevating chain 14; a conveyor belt 16 and one or more bag holders 19. The declodding chain 11, receives the potatoes and vines from the plow 10 and conveys them to the detopping chain 12, which carries off the vines and deposits the potatoes on the cross chain 13. The cross chain 13 conveys the potatoes to the elevating chain 14 which raises and deposits them in a chute 15 whereby they are conveyed to the horizontal conveyor belt 16. A seat 17 is arranged alongside of the conveyor belt 16 for an operator who removes the defective potatoes and any remaining clods, depositing them in a chute 82, which returns them to the ground. The potatoes are carried by the conveyor belt 16 to bags 18 which are carried at the rear of the machine on the bag holders 19, and a platform 20. The construction of the bag holders 19, has been patented by the applicant and forms no part of the present invention.

A hinged gate 74, is arranged in the chute 66 which communicates between the conveyor belt 16 and the bags 18. This hinged gate can be swung to the right or left to direct the potatoes to the bag suspended from any one of the bag holders 19 and allows one bag to be tied, removed and replaced by a new one while the other bag is being filled.

In order to gather the vines of the potatoes onto the conveyor chain 11, conical rollers 21 are provided at each side of the plow 10, the rollers 21 rotate inward and roll the vines onto the conveyor.

The elevation or depth of the plow 10 is controlled by means of a lever 22 operated by the driver who is seated on a seat 23. The lever 22 communicates through a bell crank and link 24 to a pivoted steering frame 25. The steering frame 25 is carried on a pair of steering wheels 26 which are provided with steering knuckles 27 operated by means of a connecting link 29 which in turn is operated by a tongue 28. Forward movement of the lever 22 will result in lowering the rear end of the frame 25 and increasing the depth at which the digger 10 will plow. Rearward movement of the lever 22 will reverse the operation.

The detopping chain 12 comprises a series of spaced bars. The spacing of the bars in the detopping chain is greater than the spacing of the bars in the chain 11 so as to allow the potatoes to fall therethrough and retain the vines.

The chain 12 moves over a series of stationary transverse bars 31 for engaging the potatoes so as to allow the chain 12 to pull them from the vines. When released they drop to the cross chain 13. The chain 12 travels from a point adjacent the depositing end of the chain 11 to sprockets secured on a shaft 41 near the rearward extremity of the machine. From the shaft 41, the chain 12 returns over shafts 42 and 43 under the entire chain 13. The cross chain 13 is thus placed between the rearwardly moving and forwardly moving portions of the chain 12.

A series of thresher arms 67 operate above the detopping chain 12 to assist in loosening the potatoes from the vines and forcing them through the chain 12. The thresher arms 67 may be operated from any suitable source.

Hopper sides 32 are provided above the chain 13 to direct the potatoes thereon. A second hopper 33, is provided at the lower extremity of the elevating chain 14 for the reception of the potatoes from the chain 13. The chain 14 carries flights 34 which retain and carry the potatoes.

It will be noted that all of the chains are of open bar construction which allows soil, clods and small potatoes to fall through throughout their entire travel through the harvester. By having the potatoes carried across, raised and returned to the front of the machine and thence conveyed to the bags at the rear, the area for the removal of clods and soil is greatly increased without increasing the length of the entire harvester. The conveyor belt 16 is provided with side boards 35 and 36. The side board toward the picker terminates short of the chute 15, as shown at 37. This allows the picker to pull the clods from the conveyor belt onto the chute 82.

A suitable frame work 38 supports the various elements of the machine. Detail description of the frame work is not deemed necessary.

Idler rollers 39 are provided to take up the slack in the returning portions of the chain 11. Similar idler rollers 40 retain the chain 14 in position. The harvester is supported and practically balanced on an axle 44, carried in driving wheels 45 which are provided with a suitable ratchet mechanism 46 for preventing rearward movement of the driving wheels from rearwardly operating the mechanism and to act as a differential when turning the harvester.

Operated from the ratchet mechanism 46, of each driving wheel 45, is a large spur gear 47 each of which meshes with a pinion 48 and a pinion 49. The pinions 49 rotate the vine-gathering cones 21 through the medium of a chain 50, sprocket wheels 51, a chain 52, and bevel gears 53. The pinions 48 are secured on a shaft 57 and operate the elevating chain 11, through the medium of a chain 54, and a sprocket wheel 55 secured on a shaft 56, which carries sprockets for the chain 11.

The shaft 56 extends under and operates the elevating chain 14 through the medium of spur gears 58 and chain 59. The spur gears 58 are employed to reverse the direction of movement.

The detopping chain 12 is operated from the pinion 48 through the medium of the chain 54 and a chain 60. The cross chain 13 operates from the pinion 48 through the medium of chains 54, 60, a chain 61 and bevel gears 62. The platform 20 is pivotally connected with the frame work 38, as shown at 63, and is carried on a pair of crazy wheels 64 which allow the platform to follow the movements of the harvester.

Since the harvester is practically balanced on the axle 44, its entire weight will be carried by the driving wheels 45. Only enough weight being allowed to rest on the wheels 26 to allow the machine to be guided by them.

The conveyor belt 16 is also operated from the pinions 48 through the medium of chains 54, 60, a sprocket wheel 75, a chain 76 and a sprocket wheel 77. The conveyor belt 16 is endless and travels over a roller 78 positioned at the forward part of the machine, and a roller 79 positioned at the rearward part of the machine. The sprocket 77 is carried by the same shaft which carries the roller 79.

While a specific form of the improvement has been described and illustrated herein, it is desired and understood that the same may be varied, within the scope of the appended claims, without departing from the spirit of the invention.

Having thus described the invention, what I claim and desire secured by Letters Patent is:—

1. A potato harvester comprising the combination of a plow for digging the potatoes; an open bar chain for elevating the potatoes; rollers positioned each side of said plow for gathering the potatoes vines onto said chain and driving means for rotating said rollers in opposite directions.

2. Means in a potato harvester for gathering the vines above the plow comprising upstanding rollers positioned at each side of the plow; traction wheels supporting said harvester and power transmission means connecting said rollers with said traction wheels so that the fore part of said rollers will rotate inward as said harvester is moved forward.

3. The combination in a potato harvester of a plow for digging the potatoes; an elevating chain for receiving the potatoes and vines from said plow and sifting the clods therefrom; a second chain of a wider pitch for sifting the potatoes from said vines; a third chain of narrow pitch positioned to receive the potatoes as they drop through said second chain and carry them to the side of the harvester; an elevator chain positioned to receive the potatoes from said third chain and convey them forwardly and upwardly to the top of the harvester; an endless belt positioned on the top of the harvester over said elevating and said second chain and arranged to receive the potatoes from said elevator chain and convey them rearwardly and bag holders for the reception of the potatoes from said belt.

4. In a potato harvester, a plow adapted to be forced into the ground to raise the potatoes; a cone-shaped, vine gathering roller rotatably mounted at each side of said plow, said rollers extending upwardly and rearwardly from said plow and driving means arranged to rotate both of said rollers inwardly.

5. In a potato harvesting machine having a plow for digging the potatoes; an upwardly extending roller positioned adjacent said plow and means for positively rotating said roller toward said plow at its forward side for the purpose of gathering the potato vines.

In testimony whereof, I affix my signature.

JAMES THOMPSON.